United States Patent [19]

Metso et al.

[11] Patent Number: 5,920,826
[45] Date of Patent: Jul. 6, 1999

[54] RADIO TELEPHONE TEXT TRANSMISSION SYSTEM

[75] Inventors: Heikki Metso; Harri Halminen, both of Tampere, Finland

[73] Assignee: Nokia Mobile Phones Limited, Salo, Finland

[21] Appl. No.: 08/658,116

[22] Filed: Jun. 4, 1996

[30] Foreign Application Priority Data

Jun. 5, 1995 [GB] United Kingdom ............... 9511337

[51] Int. Cl.$^6$ ............................................. H04M 11/00
[52] U.S. Cl. ........................ 455/557; 455/556; 455/466
[58] Field of Search .................... 455/556, 557, 455/31.2, 31.3, 170.1; 379/96; 370/327, 493; 340/825.44

[56] References Cited

U.S. PATENT DOCUMENTS

| 5,327,486 | 7/1994 | Wolff et al. ............................ 455/457 |
| 5,337,044 | 8/1994 | Folger et al. ....................... 340/825.44 |
| 5,432,841 | 7/1995 | Rimer ..................................... 455/457 |
| 5,479,475 | 12/1995 | Grob et al. ............................. 370/493 |
| 5,590,406 | 12/1996 | Bayley et al. ......................... 370/493 |
| 5,594,952 | 1/1997 | Virtuoso et al. ....................... 455/557 |

FOREIGN PATENT DOCUMENTS

| 0 555 992 A1 | 8/1993 | European Pat. Off. . |
| 2 238 144 | 5/1991 | United Kingdom . |
| 2 240 009 | 7/1991 | United Kingdom . |
| WO 85/00485 A1 | 1/1985 | WIPO . |

*Primary Examiner*—Edward F. Urban
*Assistant Examiner*—Thuan T. Nguyen
*Attorney, Agent, or Firm*—Perman & Green, LLP

[57] ABSTRACT

A communication system for transmitting text messages to a mobile terminal in a radio telephone network is disclosed. A local mobile terminal is coupled to an external computer and is used to generate, manipulate and optionally store text messages which can be transmitted or received over the radio telephone network via the local mobile terminal. The text messages are transmitted to or received from a remote mobile terminal in the radio telephone network.

32 Claims, 14 Drawing Sheets

RADIO TELEPHONE TEXT TRANSMISSION SYSTEM

FIELD OF INVENTION

The present invention relates to a communication system for transmitting a text message to a radio telephone. Additionally, it relates to a radio telephone and computer assembly, and method of operating the assembly, for such a communication system.

BACKGROUND OF INVENTION

Public radio telephone networks, for example cellular telephone networks, are an established feature of many telecommunication systems. Typically, they provide to a user services that are available to conventional land line subscribers, but with the advantage of geographical mobility. In a cellular system, for example, a telecommunications service is provided over a wide geographic area by dividing the area into a number of cells. The geographic area can extend over national borders for example in the case of the Global System for Mobiles (GSM). Each cell has a base station which provides a radio signalling channel, and audio and data channels. The radio signalling channels are utilised to page radio telephones within a base station's coverage area, and to place calls to other radio telephones either inside or outside the base station area, or onto another network such as the Public Switched Telephone Network (PSTN).

Once a radio telephone has successfully placed or received a call, an audio or data radio channel is set up with the base station, and communication between the base station and radio telephone occurs over that audio or data channel. The radio telephone may also receive control or timing information over the signalling channel whilst a call is in progress. If a radio telephone leaves the cell during a call and enters another cell, the radio telephone hands over the call to an available audio or data channel in the new cell. Similarly, if no call is in progress a control message is sent over the signalling channel such that the radio telephone logs onto a base station associated with the new cell. In this manner mobile communication over a wide geographical area is possible.

Facilities offered by radio telephone networks such as the GSM network extend to facsimile transmissions and digital data transmission as well as speech services. In addition to these conventional telecommunication services, supplementary services may also be provided. In the GSM system for example, such a supplementary system is the Short Message Service (SMS) which is supported by the GSM network and is optional for GSM network operators. Short messages are alphanumeric text messages of up to 160 characters in length for GSM, which can be sent over the radio telephone network to and from a radio telephone. In this context the radio telephone is operating beyond its conventional telephony functions and it is convenient to refer to it generically as a mobile station.

An example of a mobile station operable for the GSM network and capable of supporting SMS is the NOKIA® 2110 radio telephone 100 shown in FIG. 1 and manufactured by Nokia Mobile Phones Limited. The operation of a NOKIA® 2110 for receiving and sending SMS messages is described in pages 28 to 32 of the NOKIA® 2110 User's guide issue 3. The memories associated with the NOKIA® 2110 are its internal memory and Subscriber Identity Module (SIM) card memory. However, these memories are limited such that the SIM card typically has space for less than ten messages and the phone or mobile station memory has space for five messages of maximum length. When a SMS message has been received, the mobile station displays a message to that effect and the user can either read the message straight away or store the message for reading later. The currently active message can also be deleted by the user. A user may also select and read previously stored messages, erase them or reply to them. Additionally, a user may edit the currently active message or forward it to another telephone number.

The manner in which alphabet characters are input to the NOKIA® 2110 will now be described with reference to FIG. 1 of the drawings. To send a message the user has to key in the characters using the alphanumeric key pad 110 provided on the NOKIA® 2110. For alphabet characters this involves entering an "alpha" mode by pressing a special function key 108a labelled "ABC" and then pressing the alphanumeric key 110 labelled with the desired letter a number of times corresponding to the placement division of the desired character on that key. This is a very laborious, time consuming and awkward process. A complete description of the method of inputting non-numeric characters to the NOKIA® 2110 is provided in pages 24 to 26 of the User's guide issue 3. Having input the text message via the key pad the user then instructs the phone to send the message and inputs the phone number of the intended recipient of the message. Optionally, the message can be stored in one of the message memories (internal memory or SIM card memory) of the phone and despatched later.

BRIEF SUMMARY OF INVENTION

According to a first aspect of the present invention there is provided a communication system for transmitting a text message to a mobile terminal, comprising
 a radio communication network,
 a remote mobile terminal operable with the radio communication network,
 a local mobile terminal operable with the radio communication network, the local mobile terminal including a user alterable memory means capable of storing a text message, and
 means for coupling the local mobile terminal to an external computer apparatus for enabling data transfer between the local mobile terminal and the computer apparatus, wherein there is provided
 data processing means associated with the computer apparatus for operating on text message data transferable to the user alterable memory means, and
 message sending means for utilising said text message data for transmitting to said remote mobile terminal a text message generated at the computer apparatus,
and in accordance with a second aspect of the invention there is provided a method for transmitting text messages to a remote mobile terminal, comprising
 coupling a local mobile terminal to an external computer apparatus to enable data transfer therebetween,
 operating on text message data transferred to the computer apparatus and transferable to user alterable memory means disposed in the local mobile terminal, and
 utilising the text message data for transmitting a text message generated at the computer apparatus to the remote mobile terminal via the local mobile terminal.

According to a third aspect of the present invention there is provided computer apparatus adapted to be coupled to a mobile terminal for data transfer therebetween, and operable on text message data transferred from the mobile terminal and transferable to user alterable memory means disposed in a mobile terminal.

An embodiment in accordance with the present invention has the advantage that the typically more user friendly interface of a personal computer or such like can be utilised to manipulate and operate on data stored in user adaptable memory means of a mobile terminal such as a radio telephone. For example, the keyboard normally associated with a personal computer may be used to operate on the data, and the screen of the personal computer may display information relating to the data.

In a preferred embodiment the communication system includes a local mobile terminal operative to receive a text message, wherein received text message data is transferable to the external computer apparatus via the coupling means, and the data processing means is capable of operating on the received text message data.

Preferably the text message data is stored in memory associated with the computer device. This has the advantage that typically more memory space is available than in the local mobile terminal. Optionally, the data may be stored in the user alterable memory means of the local mobile terminal.

Typically, the data is a text message and/or representative of an address of a remote mobile terminal. Advantageously, the data processing means addresses the text message to one or more remote mobile terminal addresses for transmitting the text message to said one or more remote mobile terminals, which permits a user to forward received messages to other address, either automatically such as when absent from the computer or explicitly under user control, or to use an existing database of address, e.g. phone book.

Suitably, a plurality of text messages and/or remote terminal addresses may be formed into a predetermined sequence. Thus, messages may be sorted into an order, e.g. alphabetically. The data processing means may be capable of forming a sequence of text messages addressed to one or more remote terminal and for sequentially transmitting the text messages to respective remote mobile terminals. This has the advantage that the computer device can be conditioned to automatically send messages to remote mobile terminals at a time after the messages were input to the computer device. For example, when the user enters a cheap toll network.

Generally, the data is stored in the user alterable memory means prior to a text message associated therewith being transmitted to the remote mobile terminal, which facilitates transmission of the SMS message from the local mobile terminal.

The text message data may be in accordance with network services such as trace information news information or financial information for example. The text message data may be related to E-mail, Fax, X-400 (etc.) information. Optionally, the text message data can be delivered to different types of networks and different type of terminals. Binary or text formats may be used for the text message, and the delivery may include format conversions. The mobile terminal may be a personal digital assistant (PDA) with appropriate software included in 17, and no external mobile terminal would be needed.

The site of the pages shown in the figures can be changed. Both a single memory location or the whole memory can be copied from one memory location to another.

The user can also have an opportunity to install personal personal settings.

The text message data can be business card related and can be used to control remote terminals.

The text message data can be picked up from the computer memory and sent without storing it to local mobile terminal to a remote terminal. The connection between a local mobile terminal and a local computer is based on RS 232, PCMCIA, inductions ultra sound or infra red.

It should be noted that the mobile terminal can be used normally when connected to a local computer. The sign of successful receiving is a stamp in the SMS postcard region of a display. Also normal calls (and perhaps datacalls in the future too) are available from the software. Text message data can be utilised by other softwares both in mobile terminals and computers.

BRIEF DESCRIPTINO OF THE DRAWINGS

DETAILED DESCRIPTION OF THE INVENTION

Figure 1:
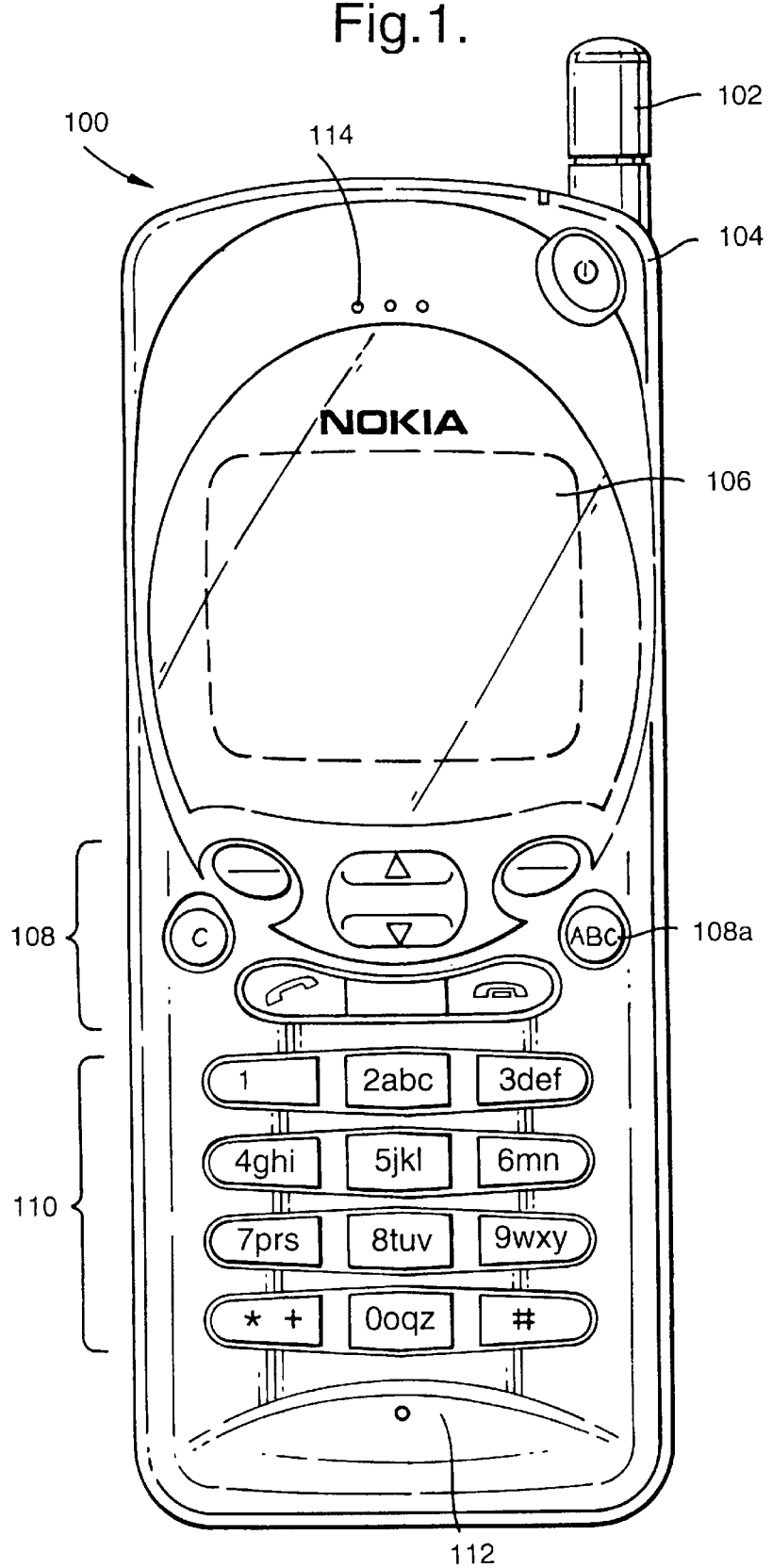
FIG. 1 shows a schematic representation of a NOKIA® 2110 radio telephone.

Detailed description of an embodiment in accordance with the invention will now be described, by way of example only, and with reference to the accompanying drawings.

The Global System for Mobiles (GSM) system is a digital cellular radio telephone system. A network area is geographically split into cells, each cell having at least one base station with which mobile stations in that cell communicate.

When a mobile station is paged by a base station, or makes a call via a base station, a communication channel (Traffic Channel, TCH) is set up between the mobile station and the base station. Additionally, a stand-alone dedicated control channel (SDCCH) is also set up for carrying signalling data between the mobile station and the base station. As a mobile station moves across cell boundaries communication with the mobile station is transferred or handed over to the base station for the new cell. In this manner a mobile station may maintain a call or receive or make calls whilst moving through a geographical area covered by the GSM network cells. Digital cellular telephone systems, in particular the GSM system, offer data services such as facsimile transmission or packet data transmission typically available on the PSTN or Integrated Digital Services Network (ISDN). However, such services are not readily adaptable to a portable telephone environment, since the terminals required to use such facilities such as facsimile machines or computers are bulky, heavy and consume large amounts of power.

To provide a text messaging service which is readily utilisable in portable telephones, GSM provides for the transmission of point-to-point short messages. These are distinguished as "Mobile Terminating Short Message Service, Point to Point" (SMS-MT/PP) for receiving short messages, and "Mobile Originating Short Message Service, Point to Point" (SMS-MO/PP) for sending short messages. These enable GSM users to send and receive short messages to and from each other. There is also provided the capability of sending broadcast short messages to all subscribers within a defined geographic area, known as "Cell Broadcast Short Message Service" (MS-CB).

A detailed description of the Short Message Service supported by GSM networks will now be described with reference to FIG. 2 of the drawings. It should be noted that although this description specifically refers to SMS in a GSM network and GSM specific architecture, the principles of operation of such text messaging services are explained and can be applied to other radio communication networks.

As mentioned earlier, SMS is a supplementary service which may be offered by a GSM network operator and to which a user may subscribe. Additionally, SMS is not an extension of fixed land line network services and does not correspond to any particular network standardisation. Thus, the implementation of SMS is operator dependent. However, the connection control for SMS messages is determined by a standard (E75107.05 SMS Control Specification).

Other networks are likely to support SMS too e.g. NMT (Nordic Mobile Telephone) which already supports standard SMS sending in mobile originated mode to other networks such as from NMT to GSM.

Figure 2:
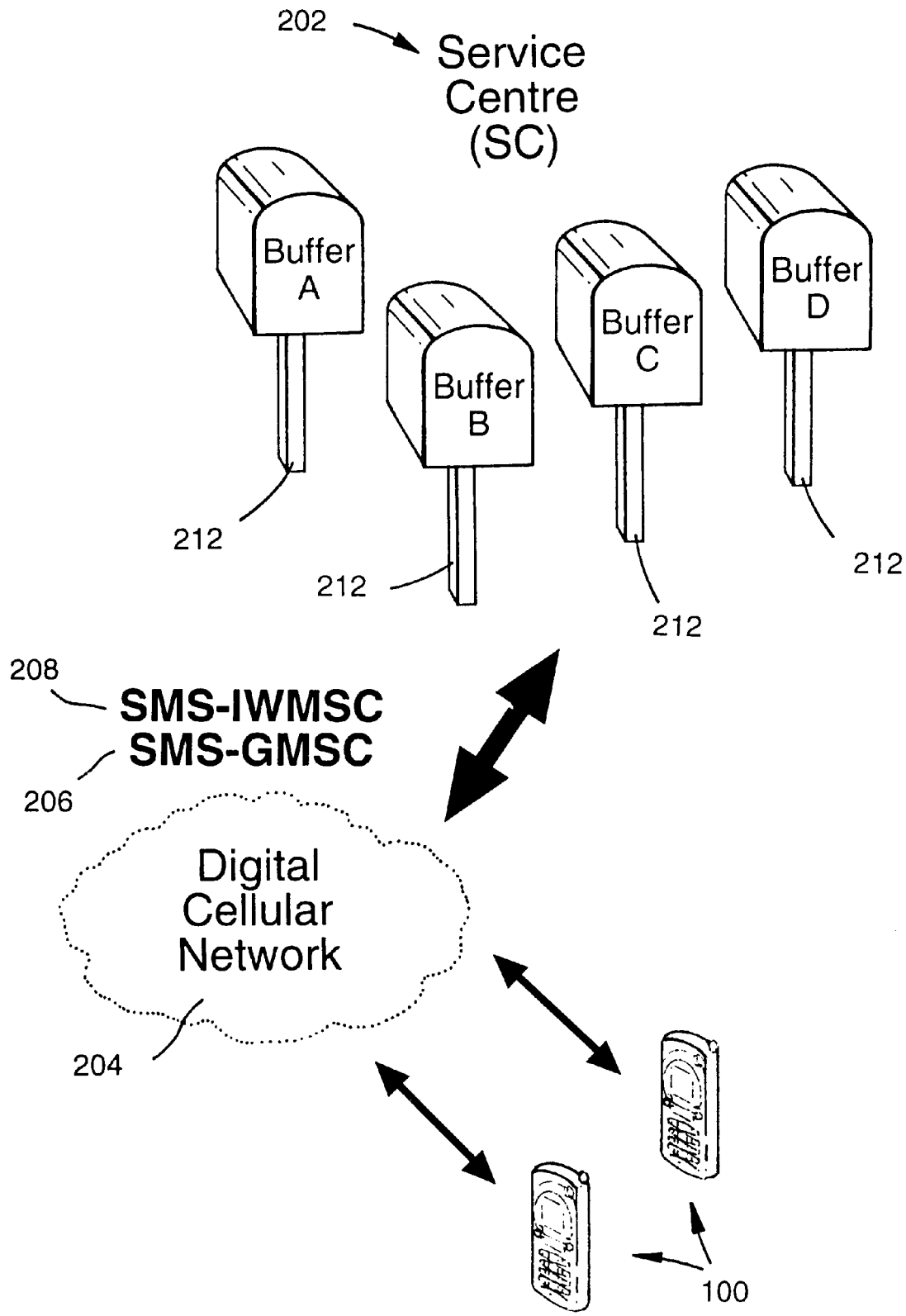
FIG. 2 shows a diagrammatic representation of an SMS messaging system in a GSM network.

FIG. 2 shows a schematic representation of a cellular network capable of supporting SMS for its subscribers. A Short Message Service Centre (SC) 202 is provided for controlling the routing of SMS messages. A Service Centre 202 may be connected to several GSM networks 204. Service Centres 202 are connected to GSM networks via one or more Mobile Services Switching Centres (MSC) which act as gateways between the GSM network 204 and the Service Centre 202. The Mobile Service Switching Centres are functionally different for mobile terminated SMS messages and mobile originated SMS messages, and are respectively known as SMS-Gateway MSC (SMS-GMSC) 206 and SMS-Interworking MSC (SMS-IWMSC) 208. The message protocol used between a mobile terminal 100 and the Service Centre 202 is known as the Short Message Transport Protocol (SM-TP). Further details of the SMS protocols may be found in documents "Technical realisation of the short message service—point-to-point", GSM 03.40, versions 3.50 and 4.4.0 released 1992 and October 1992 respectively, and incorporated herein by reference.

If a mobile terminal 100 is not available for some reason, e.g. it is not in the service area, it is powered off or its memory is full, then a message intended for that mobile terminal 100 is stored in the Service Centre 202 until the mobile terminal 100 is available. The messages are stored in buffers 212 comprising a part of the Service Centre 202.

A mobile terminal suitable for the GSM system is the NOKIA 2110 radio telephone, an example of which is shown in FIG. 1 of the drawings. The mobile terminal 100 comprises all the usual features associated with radio telephony mobile terminals, such as an antenna 102, shown in a retracted position, and a user interface. The user interface comprises the power key 104, a display 106, special function keys 108 such as the "alpha" mode key 108a and an alphanumeric key pad 110. The mobile terminal 100 further comprises transmit/receive circuitry, audio circuitry and microphone 112 and loudspeaker 114. Additionally, it comprises control circuitry, typically an appropriately conditioned microcomputer or microprocessor, for controlling the functions of the mobile terminal 100 and its user interface. The micro computer or control circuitry may also be capable of being coupled to peripheral devices such as modems via interface connections located in the housing of the mobile terminal 100.

As described earlier with reference to the NOKIA® 2110 User's guide issue 3 pages 24 to 26, alphabet characters can be input by pressing key 108a, the "alpha" key ABC and entering the "alpha" mode. Thereafter, alphabet characters are entered or selected by pressing an alphanumeric key 110 labelled with a desired letter a number of times corresponding to the placement division of the desired letter. For example, if the desired letter was "e" then the "3" key would be pressed twice, and if the desired letter was "s" then the "7" key would be pressed three times.

Figure 3:
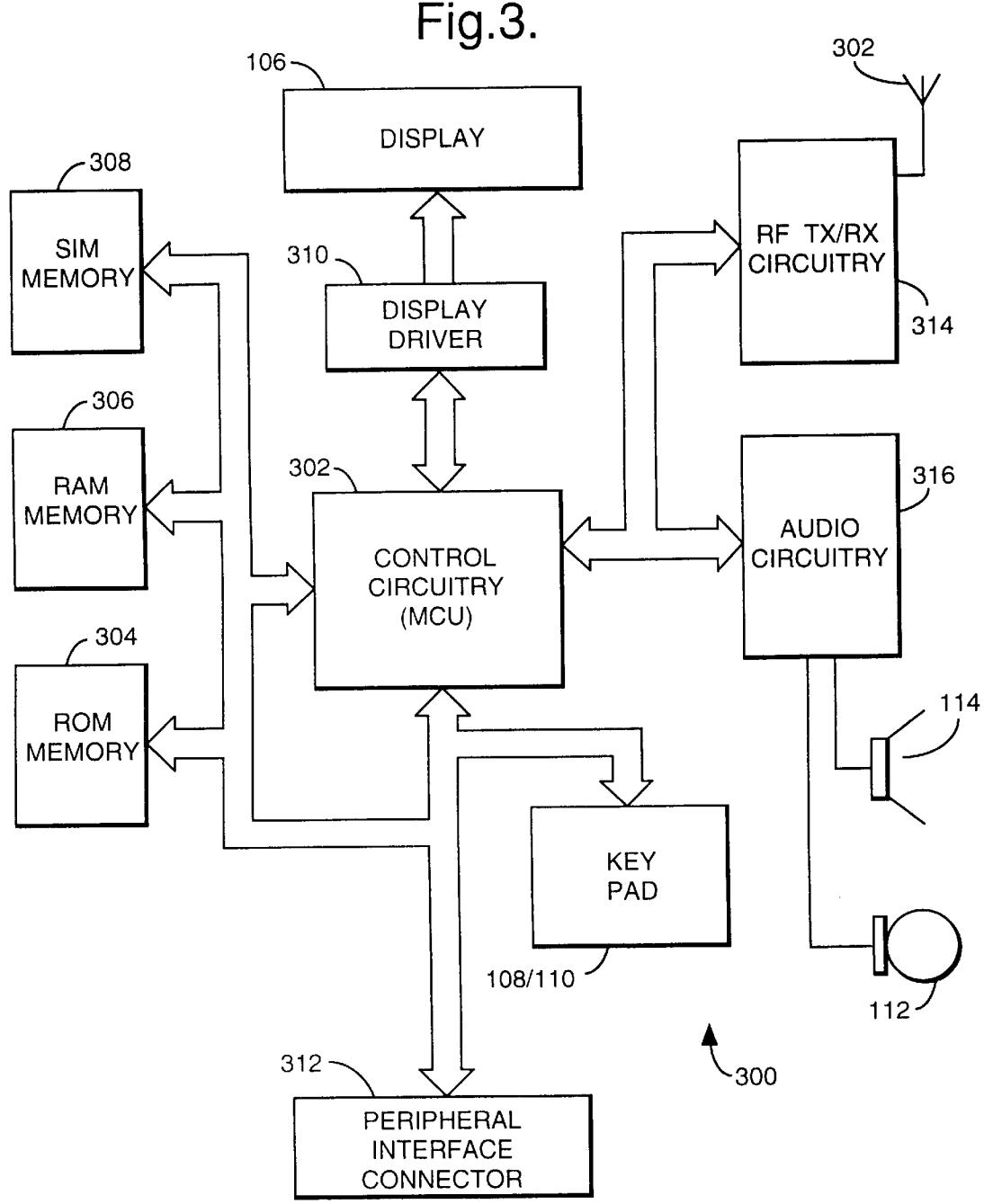
FIG. 3 shows a circuit diagram for a mobile terminal.

FIG. 3 shows a schematic diagram of circuitry typically associated with the mobile terminal 100. Where features are the same as described with reference to FIG. 1 the same reference numerals as used in FIG. 1 are also used on FIG. 3. Mobile terminal circuitry 300 as shown in FIG. 3, comprises control circuitry 302, which is typically a micro computer unit (MCU), and associated memory such as Read Only Memory (ROM) 304, Random Access Memory (RAM) 306 and memory 308, residing on the Subscriber Identity Module (SIM). The circuitry further comprises audio circuitry 316 operable in accordance with control signals from the control circuitry 302, and coupled to microphone 112 and loudspeaker 114 for respectively inputting and outputting acoustic signals such as speech from and to a user. The control circuitry 302 and audio circuitry 316 are also coupled to the radio frequency circuitry 314. The control circuitry operates on the RF circuitry 314 to control the duplexor, transmit/receive frequency and other functions normally comprising those of RF circuitry, whilst the audio circuitry 316 couples audio signals to and from the RF circuitry where they are respectively mixed up or down to or from the transmit or receive carrier frequencies. The control circuitry 202 is also coupled to the key pad 108/110, and to a peripheral interface connector for coupling the control circuitry 202 and other circuitry, e.g. memories 204, 206, 208 to external devices.

The circuitry shown in FIG. 3 is operable in accordance with the control circuitry to send data between the various units of the mobile terminal circuitry 300, and to read and write data to and from the various memories 304, 306, 308. The control circuitry 302 is typically a microcomputer unit appropriately conditioned to control all the functions of the mobile terminal.

Figure 4:
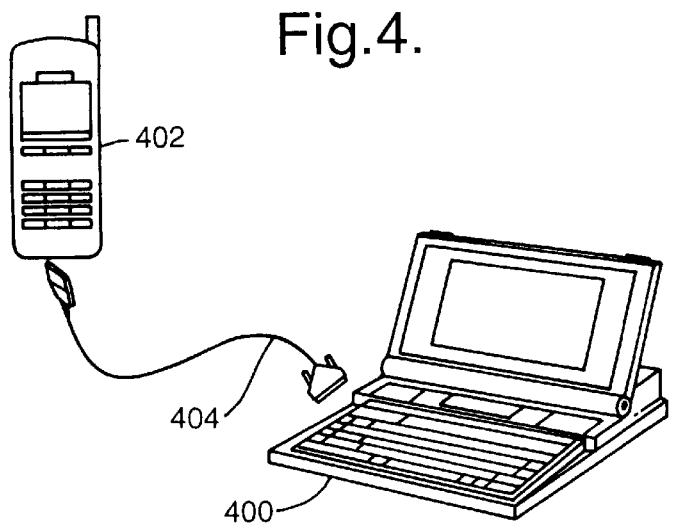
FIG. 4 shows a radio telephone and computer assembly suitable for operation in accordance with the invention.
Figure 5:
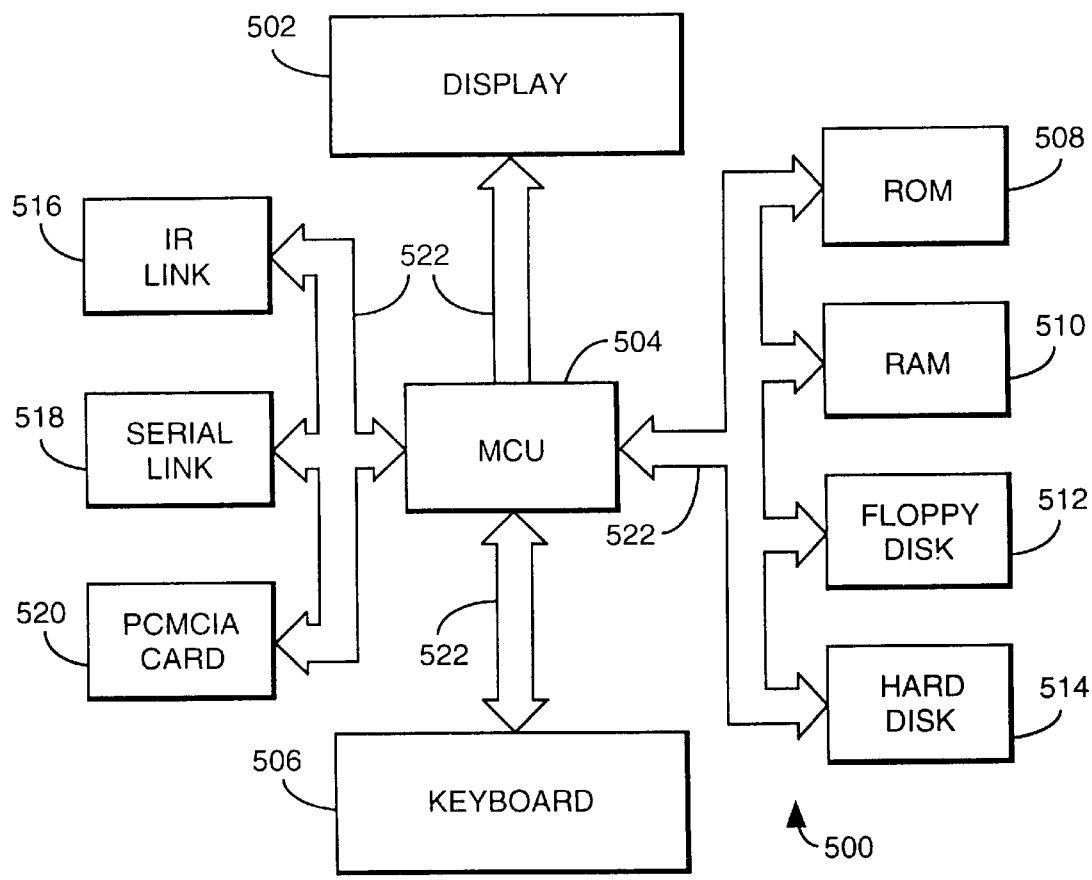
FIG. 5 shows a circuit diagram for a personal computer.

In accordance with an embodiment of the invention there is provided a peripheral device connectable to the peripheral interface connector 312 of the mobile terminal circuitry 300, and adapted to control the SMS functions of the mobile terminal 100. The peripheral device is adapted to expand the user interface of the mobile terminal 100 in order to render it more simple to use, particularly when using the SMS feature of GSM. In order to achieve this function the peripheral device has a large screen and a "QWERTY" style keyboard. Additionally, it is advantageous for the peripheral device to have greater user operable memory than the mobile terminal 100. A suitable peripheral device may be a personal digital organiser or a personal computer 400 as shown in FIG. 4, connected to a local mobile terminal 402 also comprising circuitry 300. Circuitry for a personal computer is shown schematically in FIG. 5. The control circuitry 504 for a personal computer 400 is typically a microcomputer unit, appropriately conditioned to control the other elements of the computer circuitry 500. The control circuitry 504 is coupled to display 502 which is adaptable to display information stored in the memories 508, 510, 512 and 514 of the personal computer 400, or information input to the personal computer 400 via the keyboard 506 or peripheral interface connectors such as Infra Red (IR) link 516, serial port 518 such as an RS 232 port, PCMCIA card port 520 or a parallel port. Other coupling methods may be used such as optical cable, ultra sound and inductive coupling. Data displayed on the display 502 and stored in the memories 508, 510, 512, 514 may be manipulated under control of the MCU. The elements of the personal computer circuitry 500 are connected together and to the MCU via data and address buses 522. This facilitates the transfer of data between the elements of the personal computer circuitry 500.

The control circuitry or MCU 504 is appropriately conditioned to be capable of interfacing with the local mobile terminal 402 via peripheral interface connector 516, 518 or 520 with peripheral interface connector 312, over a link 404. As an example, this may be a serial link 404 between the serial link 518 of personal computer 400 and a serial peripheral interface connector 312 of the local mobile terminal 402. The MCU 504 via the link 404 and respective peripheral interface connectors can request the transfer of data stored in the SIM card memory 308 or RAM 306 of the mobile telephone 100 and relating to SMS messages. That portion of RAM 306 which stores SMS messages is typically referred to as Short Code Memory SCM.

Data transferred to the personal computer 400 may just be copied such that the memories in the local mobile terminal 402 still contain the data. Data copied or transferred from the local mobile terminal 402 may be stored in the memories of the personal computer 400 and displayed on the display 502. Of course, data stored in the personal computer memory may be copied or transferred to the local mobile terminal memory. Since the user interface of the personal computer 400 is greatly enhanced relative to the local mobile terminal 402, a user can manipulate SMS message data more easily via the personal computer 400 than via the local mobile terminal 402. For example, SMS messages may be edited using the personal computer 400, and SMS messages may be easily created using the keyboard 506. The mobile terminal memories 306, 308 may also be directly adapted by the user via the personal computer 400 to edit, create or order SMS messages for example.

Generally, a personal computer 400 will have more memory than the local mobile terminal 402. Additionally, that memory may be "archive" type memory such as floppy 512 or hard 514 disk. This enables the storage and manipulation by the personal computer 400 of more SMS messages than can be achieved by the local mobile terminal 402. SMS messages can be stored and archived in the personal computer 400, put into alphabetic order (by sender) or date order, or some other grouping for ease of reference by the user. Additionally, the personal computer can be configured to provide an address book which is larger than the telephone number storage facility usually available on mobile terminals. This address book can be functionally related to the SMS message features of the personal computer such that a received SMS message can be linked to a name in the address book and automatically forwarded to the telephone number associated with that name. Optionally, if the local mobile terminal 402 supports calling line identification CLI then the number of the party sending the SMS message may be linked to the address book so that the name and other personal details may be appended to the SMS message stored in the personal computer 400.

Controlling the SMS features of the local mobile terminal 402 via a personal computer 400 provides greater flexibility as to when SMS messages are transmitted. For example, a set of SMS messages can be created and the personal computer 400 configured to sequentially transmit them during a time when toll charges are lowest. Alternatively, they may be transmitted in sequence once the local mobile terminal 402 is in a network service area, having been out of service (i.e. in an aircraft). Additionally, "standard" messages or often used messages may be created and stored to be called up when required.

Figure 6:
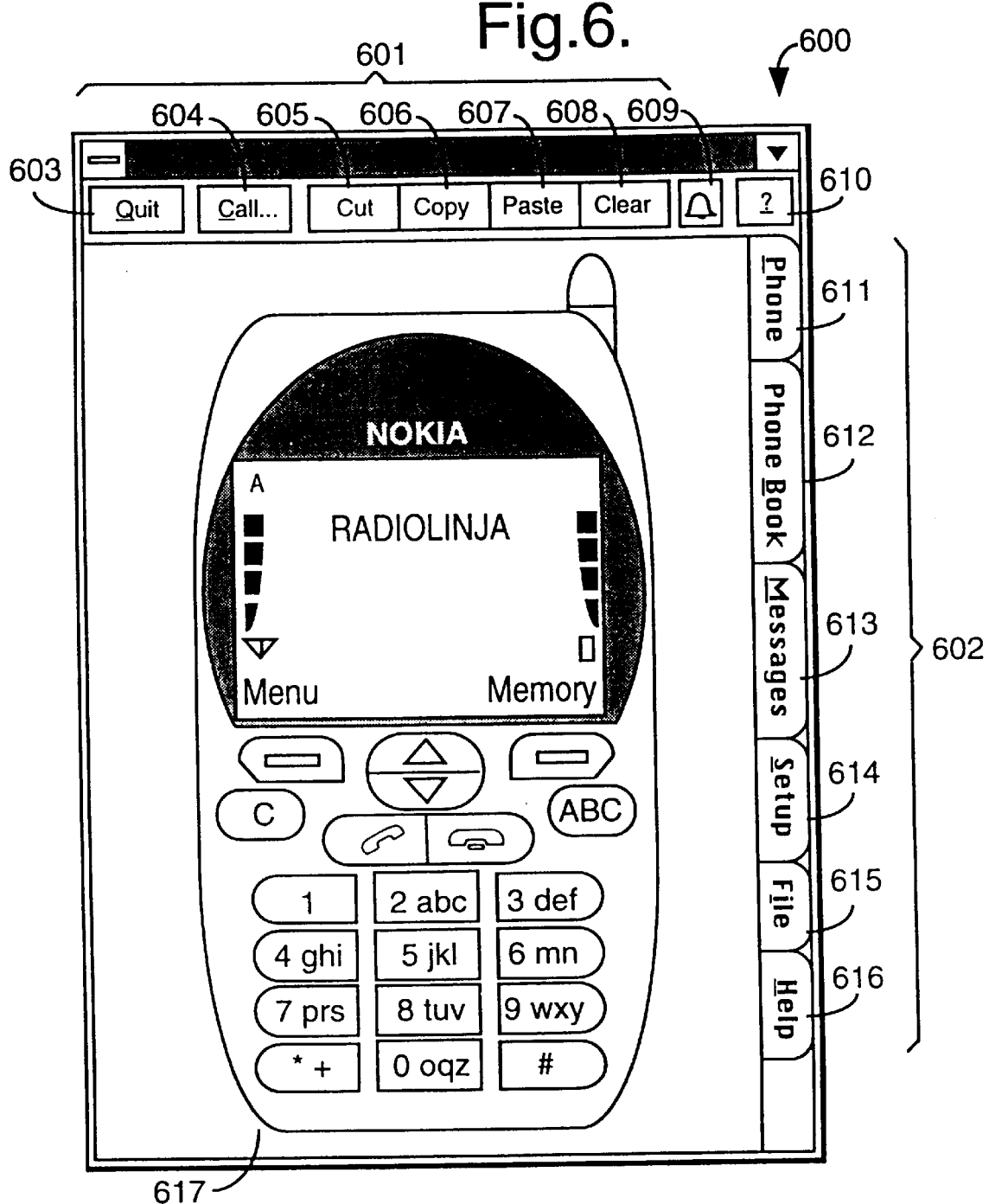
FIGS. 6 to 15 show user interface screens for a personal computer adapted to operate in accordance with the invention.
Figure 7:
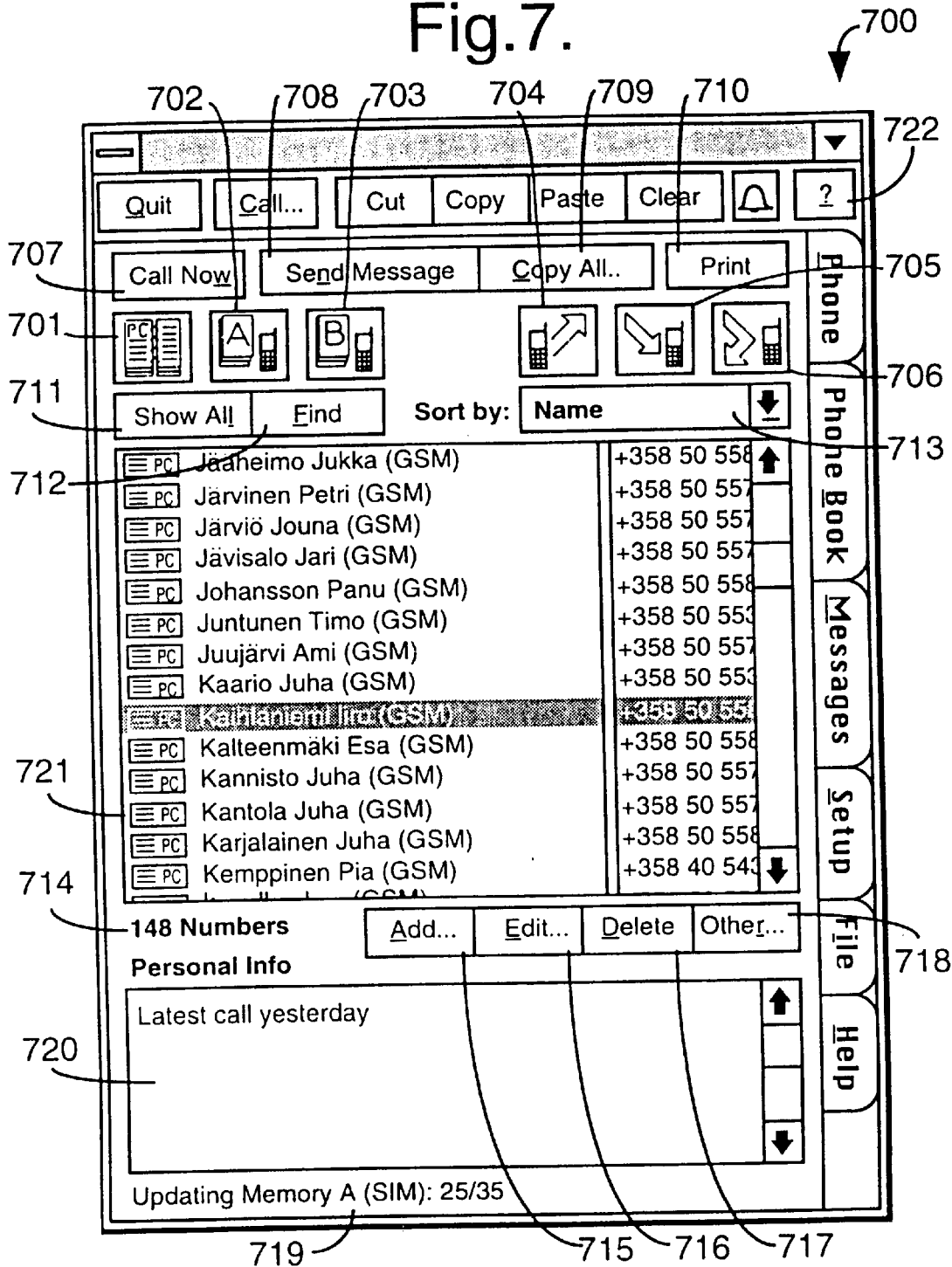
Figure 9:
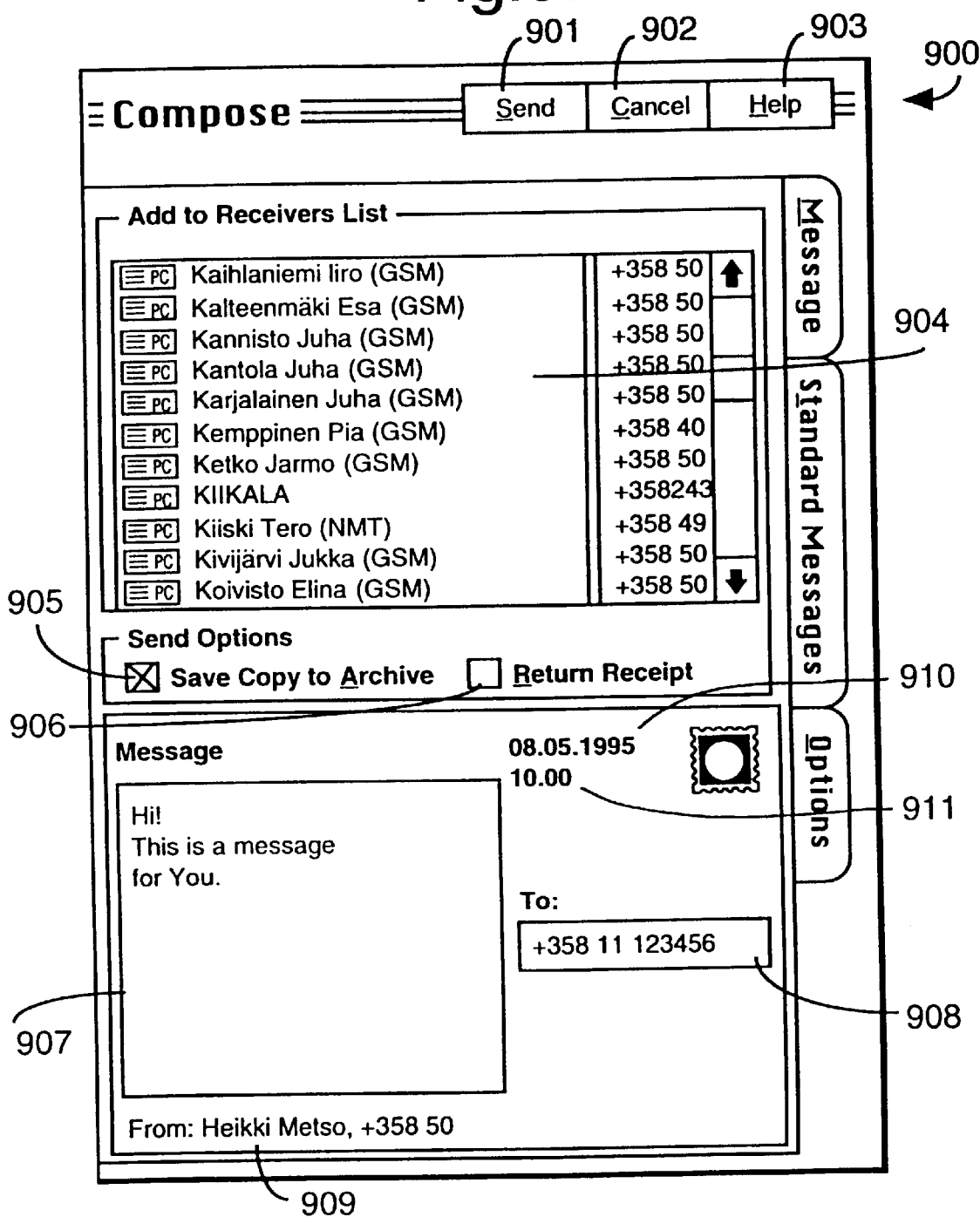

Particular user interface configurations for a personal computer 400 configures to control the SMS messaging of a local mobile terminal are shown in FIGS. 6, 7 and 9.

The user interface for a personal computer configured in accordance with the present invention is shown in FIG. 6. The user interface has been implemented as a phone memo-shaped. The phone memo consists of seven separate pages for different function groups. Additionally, there are some common functions implemented with convenient icons, e.g. the Call button 604 in each page for normal audio calls.

The cover sheet or the main page of the phone memo 600 displays the NOKIA® 2110 GSM phone. This page appears each time the personal computer is operated in accordance with the invention. On this page the user can control the phone utilising the personal computer as easily as by pressing the buttons of the phone physically with a finger, e.g. the normal audio call will succeed. The phone can be operated by moving a cursor, e.g. a mouse, to the required function or number and activating that function. A horizontal button bar 601 and vertical button bar 602 are provided across the top and down one side of the cover sheet to provide easy movement through the functions of the invention and various pages of the user interface.

Each of the buttons on respective button bars have been labelled and have the following functions. The Quit button 603 when activated causes the current software to cease running and returns a user to a main windows menu for example. By activating the Call button 604 it is possible for a user to make a call. Activation of the Call button 604 causes the software to request the number of the telephone to which it is desired to make a normal voice call. Buttons Cut 605, Copy 606, Paste 607 and Clear 608 are the usual edit functions available for the processing of text. The Bell icon 609 flashes and a ring tone is heard when an incoming call is present. The Query icon 610 accesses the Help pages for the respective displayed page, in this case the cover sheet 600. The buttons on the vertical button bar 602 have the following functions. The Phone button 611 displays the main page, i.e. page 600 as shown in FIG. 6, the Phone Book button 612 displays the Phone Book page, the Message button 613 displays the message page or data page, the Set-up button 614 displays the set-up page which permits a user to configure the system to their own liking, the File button 615 sets up the file page and the Help button 616 gives advice on how to use the Help icon (Query 610) for the particular page of software displayed.

The other pages of the user interface accessed by the vertical button bar 602 i.e. Phone Book 612, SMS messaging and Data 613, Setup 614, File 615, and Help 616 pages. These will be described in more detail in the following.

The Phone Book page is shown in FIG. 7, and is used for controlling calls. The page includes many icons to assist in selecting functions for controlling and editing the phone settings. On this page the user is able to edit different memory locations in various memory spaces, handle incoming, succeeded and missed calls and send short messages. For instance, when one of the memory spaces has been selected the separate memory locations including status, the name and the corresponding number of the location can be seen listed in the list box 721. Furthermore, the user can add some personal information in location 720 of the page for a desired phone number, and manage the Phone Book data base of the SMS messages. The user may also automatically sort the SMS messages, e.g. alphabetically by name, as shown in FIG. 7, or in some other way such as by country code or time message received. The Phone Book page also has the horizontal 601 and vertical 602 button bars shown in FIG. 6. Additionally, it has the following icons. The PC icon 701 is used for selecting the particular memory location into which a particular person's name and telephone number is to be placed. Icon A 702 selects the SIM memory locations for storing names and numbers and icon B 703 selects memory locations in a short code memory of the mobile terminal, that is to say the user adaptable memory locations for the mobile terminal. Each of the memories (memory locations) can be selected stored, edited and personal information added. Always the virtual memory is available even if the phone is not connected. The icons labelled 704, 705 and 706 are used to review a stack of the last ten calls for example, to review received calls and missed calls respectively. The Call-now icon 707 initiates a call by making the call to the selected number. This is in contrast to activation of the Call button 604, where once a number is selected it must be accepted by clicking on an OK button prior to the call being made. The Send Message icon 708 causes the display to go to a page where the message to be sent and the selected number of the mobile terminal or target is displayed. The Copy-all icon 709 is used when copying a database from a whole memory to another, for example, when copying a database from a PC to the phone or SIM card memory or vice versa. It is possible to print out selected items by activation of the Print icon 710. Activation of the Show-all icon 711, shows all the memory locations in the selected memory (SIM, phone, PC) no matter in which memory they are physically located. In this manner it is possible to see all the phone numbers. The Find icon 712 permits the user to find a particular memory location according to a particular search item, for example memory location number, or name or some other personal information. Data can also be sorted by use of the Sort-by icon 713. The particular sort field is entered in the "name" field on the display. The total number of phone numbers in a selected memory is indicated on the display in the region identified by reference 714. It is possible to add personal information related to a particular selected memory location by use of the Add icon 715. This information may be edited by using the Edit icon 716, or deleted using the Delete icon 717. The other icon 718 gives two possible functions, i.e. to move and to copy. The Move button is for moving memory location information, or Phone Book number information from one memory to another. The copy feature is for copying a single memory location information (such as Phone Book number or personal information) from one memory to another. The difference between the "copy" icon 718 and the "copy-all" icon 709 is that with the "copy" icon one can copy a single memory location whereas the "copy-all" icon is for copying all the memory locations from one place to another. At the region of the display indicated by reference 719, the user is given information as to their current activities, and in the case displayed in FIG. 7 it is indicated that there are 25 memory locations from 35 which have been updated. Region 720 of the display is reserved for personal information. When a cursor has been set into this field, the cursor may be used to type in personal information relating to a particular selected phone number. Icons identified by reference 721 show the selected memory locations in the selected memory. The information shown is divided into the following parts, a memory item which describes in which memory the actual phone number exists, a name and a number. The Query icon 722 can be activated to access page related help information.

Figure 8:
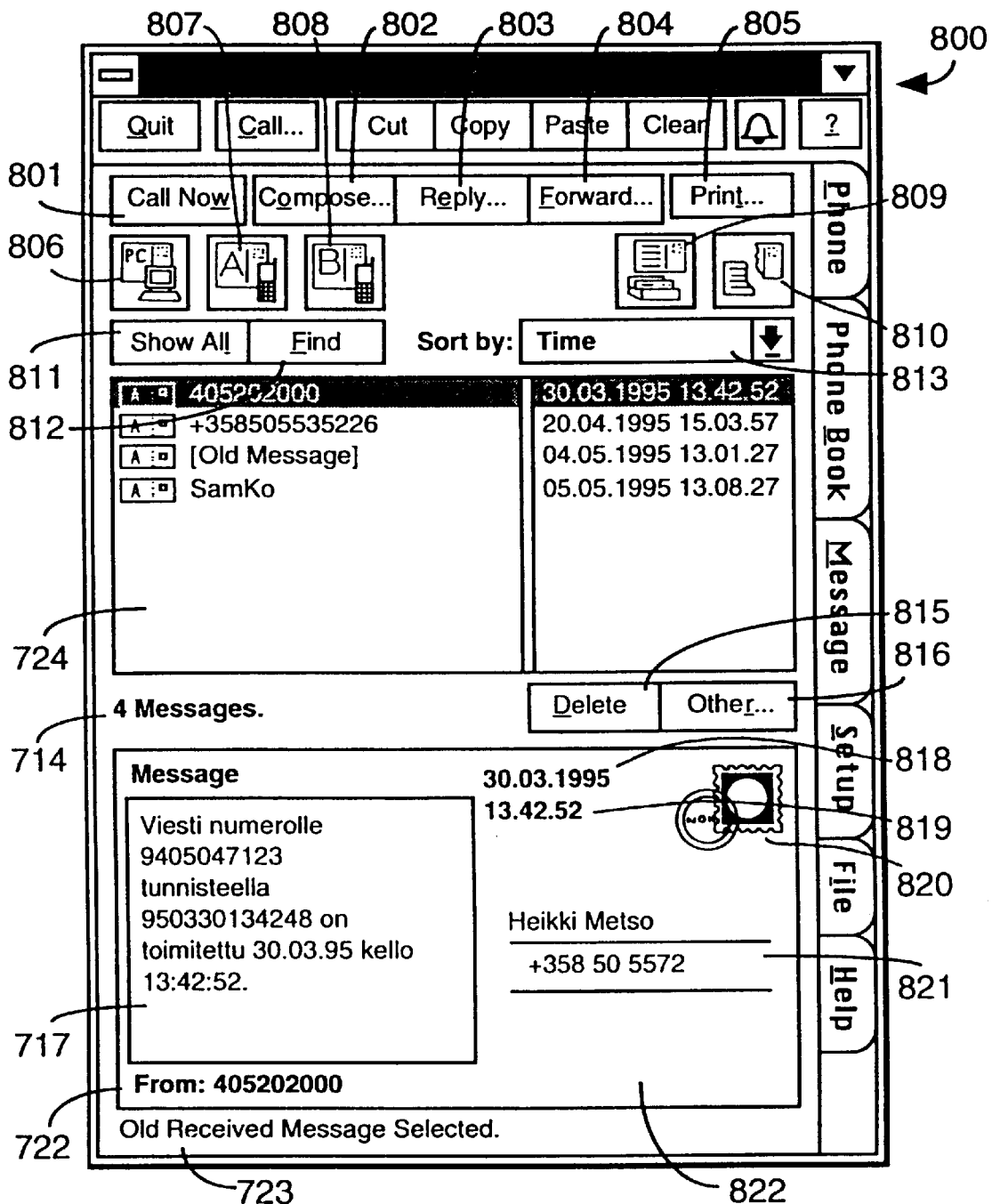

When the SMS page 800 has been selected, via the vertical button bar for example, the window described in FIG. 8 will appear. On this page the user is able to send, reply, forward, print and delete short messages. Additionally, there is a possibility to edit saved messages from different memory locations and watch the queue of outgoing and removed messages. The status of a memory location and other information associated with a particular message are shown as in the Phone Book, in the list box.

The SMS page 800 comprises horizontal and vertical button bars 601, 602 and additional icons as described below.

The Call now icon 801 has a similar function as to Call now icon 707 described in relation to FIG. 7. The Compose icon 802 can be activated to begin composition of a new message. The steps for composing a new message are described later in relation to FIG. 9. The Reply icon 803 is used for replying to a message. The address or subject information are filled in automatically and only the information which comprises the message must be typed onto the SMS card (see description of FIG. 9). Messages may be forwarded by use of the Forward icon 804, in which a selected message can be forwarded to another user. In this mode the new address information is requested and it is possible to edit the outgoing message before it is actually sent. The Print icon 805 facilitates the printing of a selected message on the default printer for the computer using the present assembly. Icons labelled 806, 807 and 808 respectively access messages stored in the PC memory, the SIM memory or the short-code phone memory. By activating the icon labelled 809 outgoing messages not yet sent can be reviewed. However, activation of icon labelled 810 causes the deletion of messages. The Show-all icon 811 shows all the messages no matter where they are stored, except deleted messages. To delete the deleted messages permanently the user must press the Delete button in this window i.e. first select deleted messages and then press the Delete button. The physical location is shown with a small icon attached and if the message has been deleted it is shown with a broken icon. In the present display the icon is a postcard where the particular memory location (A or B) indicated on the postcard. The Find icon 812 can be used in searching for a particular message in accordance with a search item such as the senders name, date, or any other search word that may be appropriate. The messages may be sorted utilising the Sort icon 813 and can be sorted by any convenient means, for example in FIG. 8 the messages can be sorted by time of sending or time of receipt. The number of messages actually stored in a particular selected memory is shown in that region of the display identified by reference numeral 714. The Delete icon 815 and Other icon 816 has a similar function to the corresponding icons described with reference to FIG. 7. The actual message to be sent is displayed in the region of display identified by reference numeral 717 and represented as being part of a postcard. The receive date or sending date is displayed at the region identified by reference numeral 818 and that part of the display identified by reference numeral 819 shows the received or transmitted time. Icon 820 is a frank over a stamp displayed on the postcard which indicates a successful sending of a message. That region of the display identified by reference to number 821 displays the received information and reference numeral 722 displays the sender information which may be the name or phone number of the sender. The user status is indicated in that part of the display identified by reference number 723. Typically, unread messages are highlighted for ease of identification by a user.

In the bottom of the page 800 there is a shape of a postcard 822, which is used for sending a short message. Actually, the sending of short messages is almost as easy as sending a real postcard. The sending of a new message begins such that the Compose 806 button is clicked first. Now a new subpage 900 will appear. This subpage is shown in FIG. 9. The name and the address of the receiver can be selected either from a memory location displayed on the page or they can be typed in by the user. Then the actual message of up to 160 characters is added to the postcard. The message may be a standard message from a Standard Messages 1000 subpage such as "Call me in the office". Finally, the Send button 901 is clicked for sending. Now the postcard can be franked, i.e. date 910 and time 911 stamps, as a mark of successful sending. The Options subpage is used only for setting the SMS parameters, e.g. for setting the maximum time, how long the messages are stored in the SM-SC.

A more detailed description of the compose process now follows. FIG. 9 shows the basic compose page. By activating the Send icon 901 it is possible for a written message to be sent to a designated receiver. A message may be cancelled by activation of the Cancel icon 902. The Help icon 903 permits access to a help file giving information on how to send a message, what to do in what order and how to attach text, inter alia. The region of display identified by reference numeral 904 comprises an information field for the physical message memory such as target information, SIM phone or PC memory. That region of the display also comprises the name, phone and phone number of a designated mobile or target terminal. Note that the database may differ from the Phone Book database and is actually a separate database from the message database. This means that a user may have their own database for phone numbers and messages. Button 905 is related to the option for saving a copy of a transmitted message to the user's own database, and Button 906 is related to the option for receiving a receipt when a receiver has actually read the sent message. The region of the display identified by reference numeral 907 is that portion of the display in which the message being typed is displayed. In the field identified by reference numeral 908 a receiver's information may be selected from the database or may be typed in. Reference numeral 909 indicates a region of display where the sender's information is displayed. Reference Numerals 910 and 911 respectively indicate those regions of the display where the date of creating the message is displayed and the time of creating the message is displayed.

Figure 10:
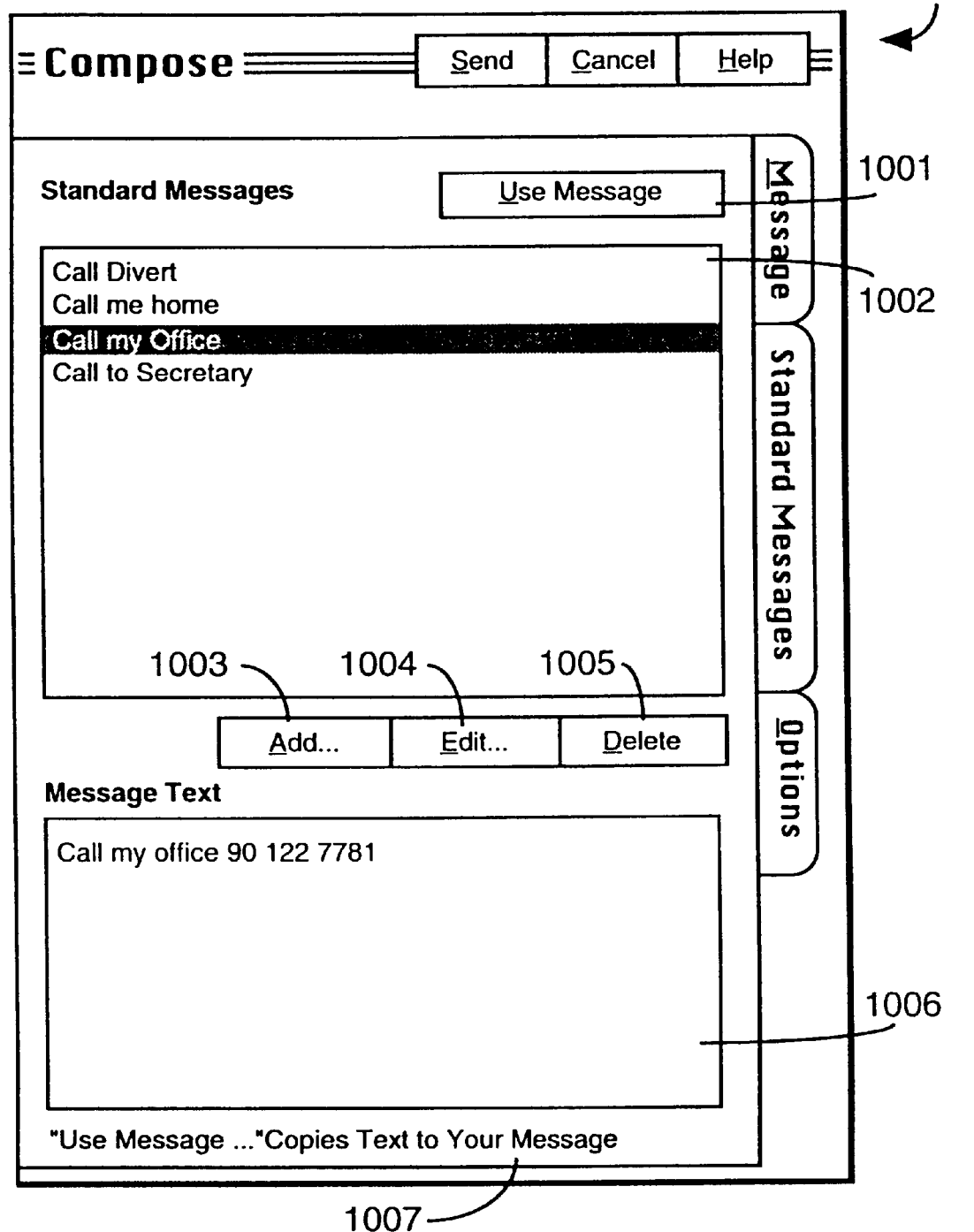

FIG. 10 shows a special "compose" page 1000, simply used when standard messages are selected on the usual compose page shown in FIG. 9. The Use Message icon 1001, uses a selected message, which may be a standard message having some extra text added to it, or even text deleted from it. This function copies the message text into the postcard region. Reference numeral 1002 indicates that region of the display where the names of the standard messages are shown. If a user wishes to add a standard message to his database then by using the Add icon 1003 such message can be created and added to the database. The Edit icon 1004 permits editing of an existing message, and the Delete icon 1005 permits deleting of an existing message or a part thereof. That region of the display identified by reference numeral 1006, is the field where messages are edited, created and shown to the user. That part of the display indicated by reference numeral 1007 indicates the status of what the user is actually doing. Business card information may also be displayed on this page, and the information may be related to the Phone Books. Typically, such business card type information would be a standard message type and would be utilising this page.

Figure 11:
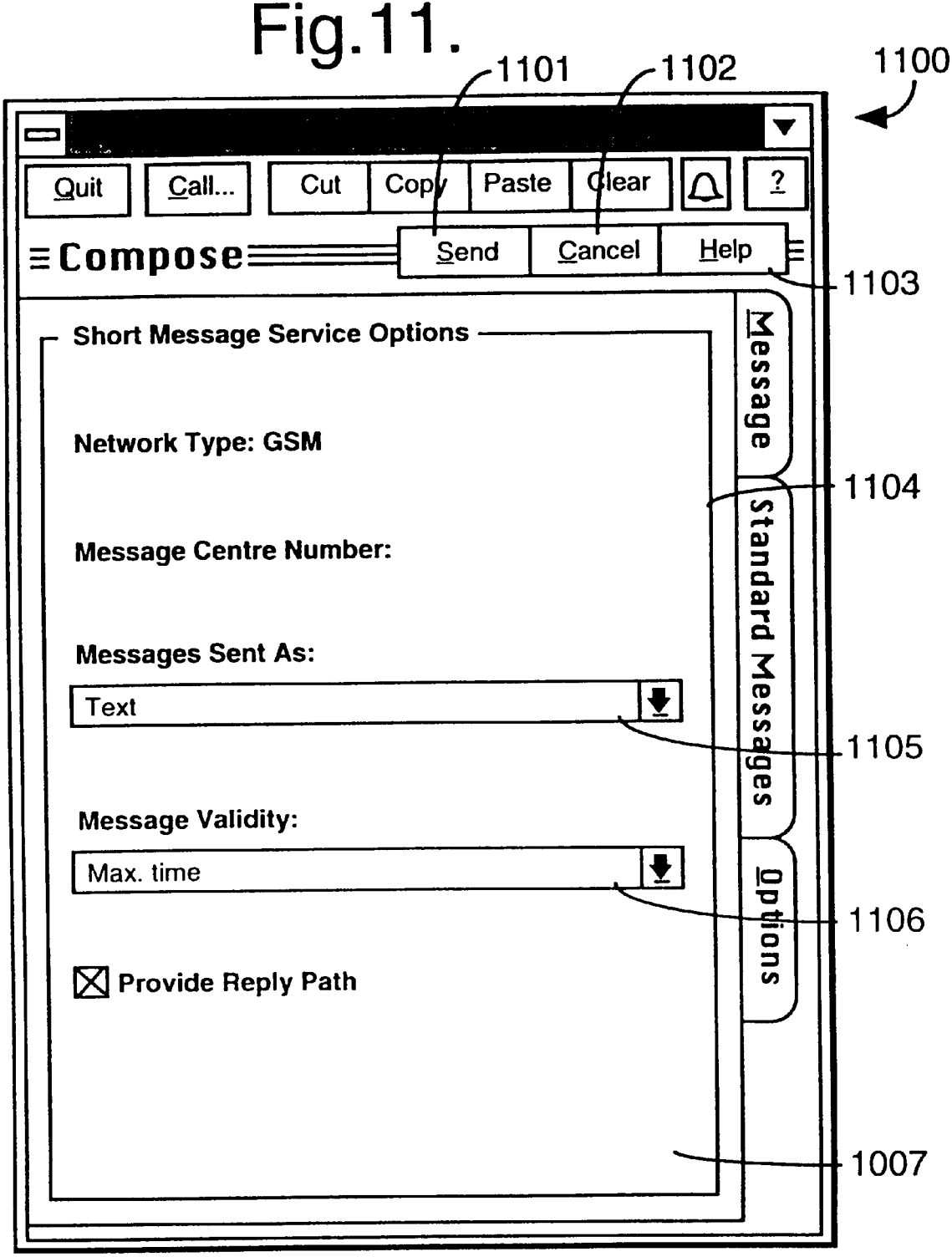

FIG. 11 shows the page displayed when the "options" icon is selected on one of the compose pages. Buttons 1101–1103 have the same functions as the identically labelled buttons described in relation to FIG. 9. That region of the display identified by reference numeral 1104 is used for showing general information about the radio telephone network onto which the assembly is connected. That is to say, it indicates the network type i.e. GSM, US-TDMA, PCN, PCS etc., and the message sent and number. That region of the display identified by reference numeral 1105 is used to indicate the manner or format in which messages are sent, for example they may be sent as binary information or in a text format. The time during which a message may be validly stored in the SM-SC, is shown in that part of the display identified by reference numeral 1106. It should be noted that the time can be changed or updated. There is an option to provide for a reply path if a selected receiver wishes to reply to the message and the user is not available to answer it. This option is available in the region identified by reference numeral 1107.

Figure 12:
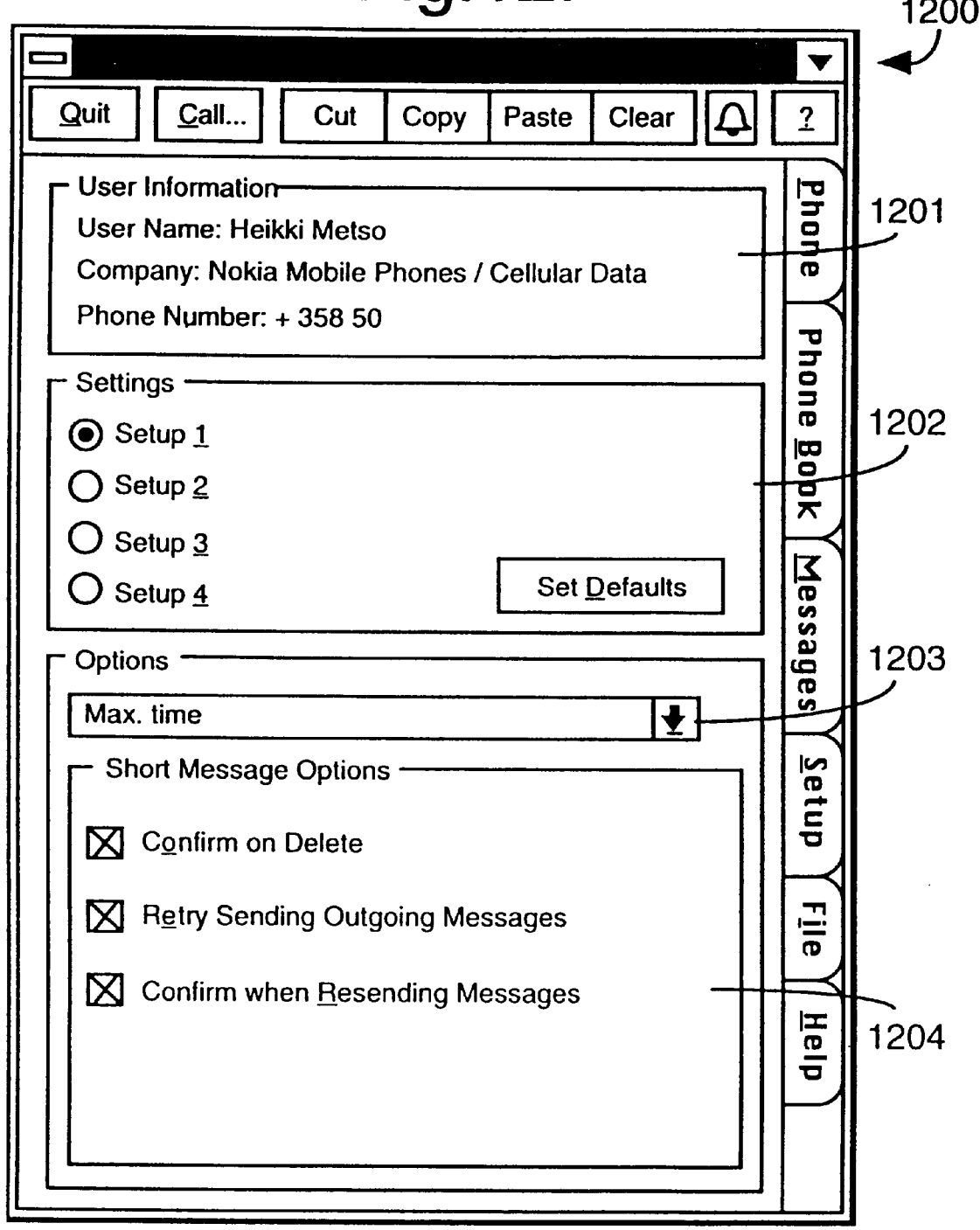
Figure 13:
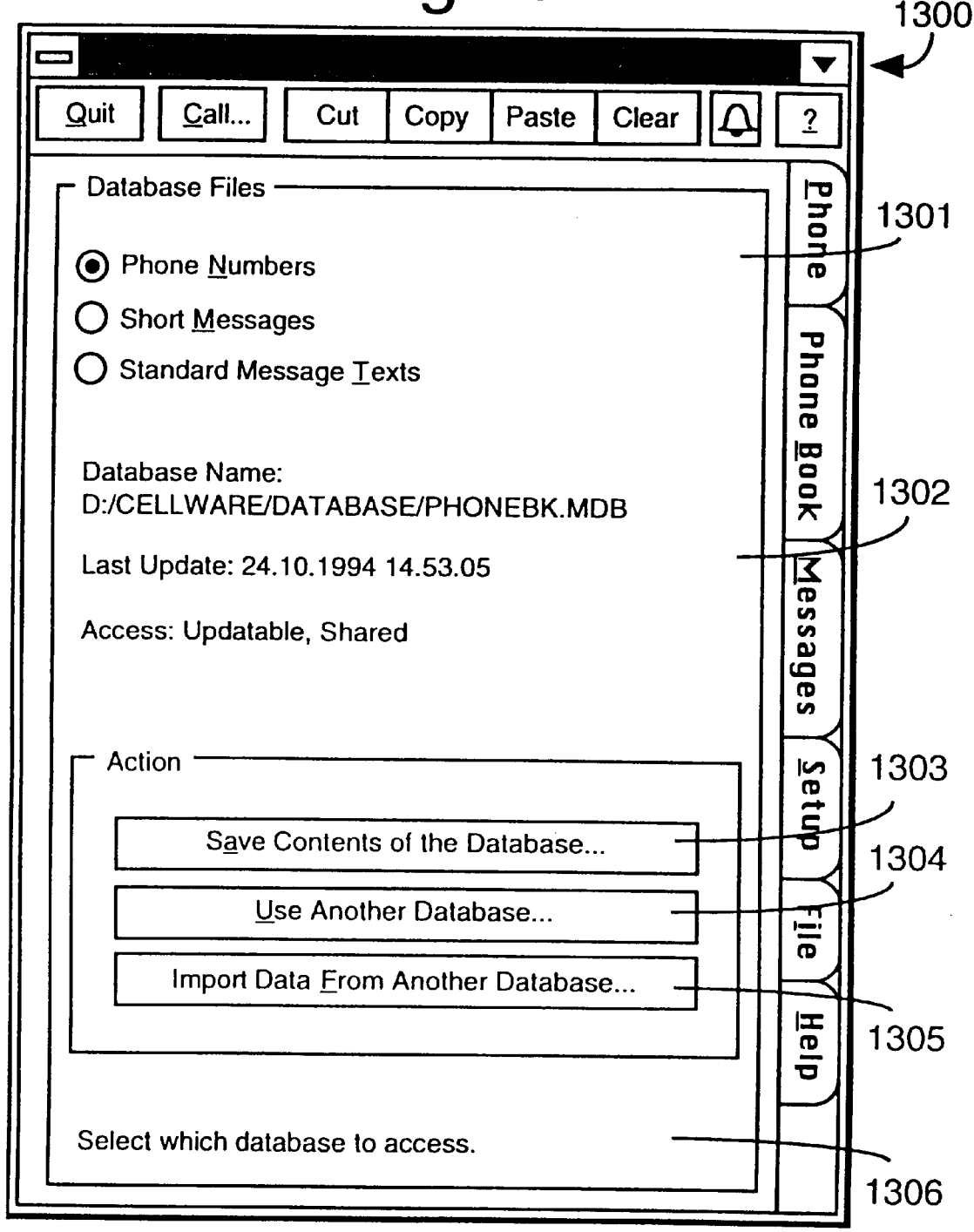
Figure 14:
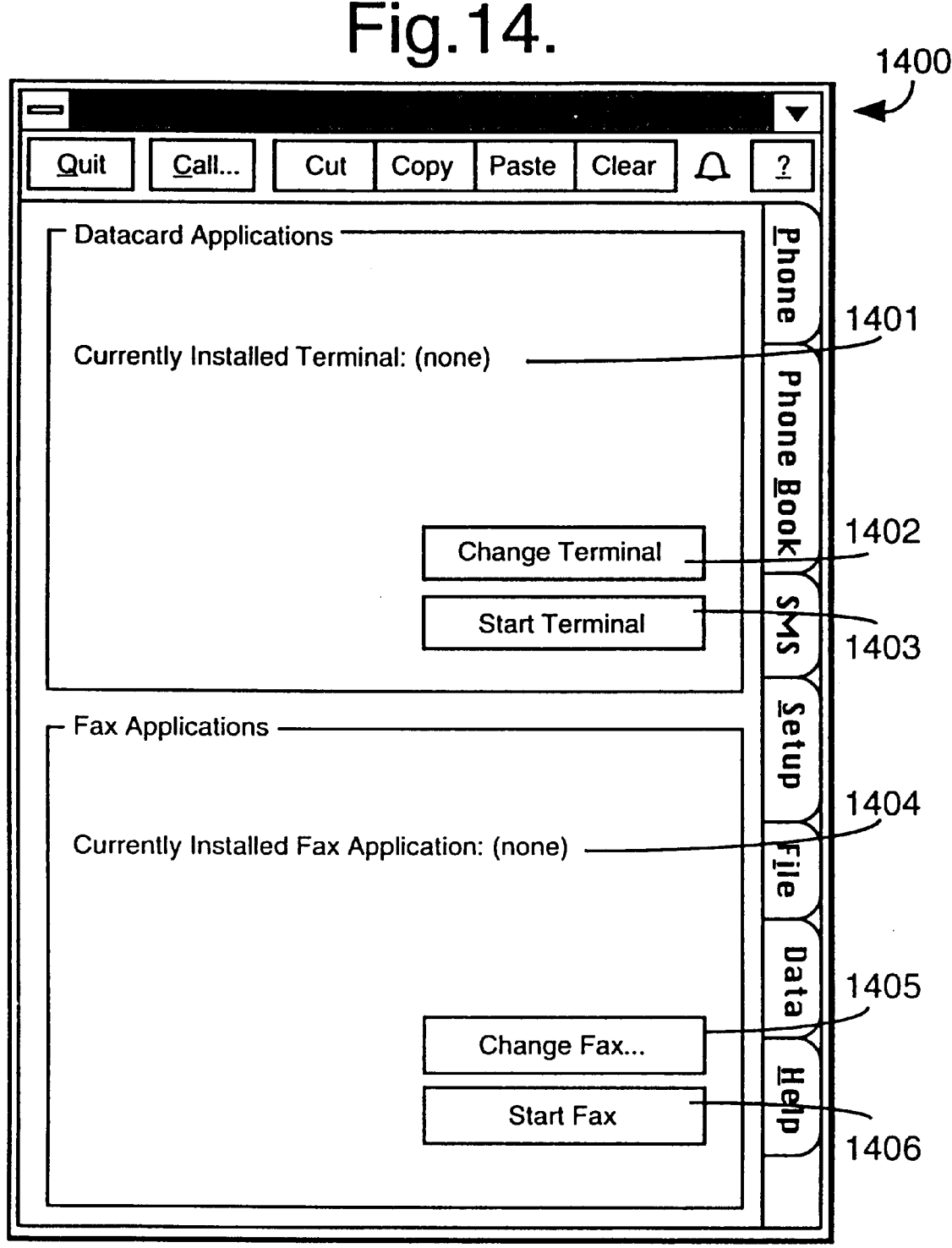

Typically, other pages are available such as the Setup page which offers the possibility to set font sizes and types and change the user information. This is described in FIG. 12. FIG. 12 shows the Setup page. Personal information can be input into a field identified by reference numeral 1201. Reference numerals 1202–1204 are used for personal setups i.e. for foreign use, continuations, message deletions, alteration of fonts, re-try of sendings, changing the colour of the display, changing a brand of a phone displayed on a display, and other such user personal options. Additionally, the interface to the phone may be altered. A File page is provided for making backups and for restoring and is shown in FIG. 13. Database elections for phone numbers i.e. from the Phone Book database, short message service messages (short message database) and standard messages (standard message database) may be selected via the icons displayed in the region of display identified by reference numeral 1301. At 1302 the latest update information is displayed such as where and with what name a selected database is located, and the status of that database. Icon 1303 provides for backup copies of databases, icon 1304 is used for restoring databases and icon 1305 imports information from one database to another. That region of the display identified by reference numeral 1306 is an information field and indicates which data has been selected for access. A data page shown in FIG. 14 is provided for setting extra accessory services, such as NOKIA® data card services. The data page 1400 comprises icons and instruction lines for setting up accessory services. In FIG. 14 a data page 1400 is shown suitable for use with a NOKIA® data card. Label 1401 indicates a region of the display in which a selected terminal type is displayed, and 1402 identifies an icon which facilitates the change of terminal. Activation of a particular selected terminal is achieved by icon 1403. For fax applications shown in a lower half of page 1400 reference numeral 1404 indicates a region of the display for informing the user which particular fax application is currently in use. Icon 1405 allows the fax application to be changed by the user and icon 1406 starts the fax application.

Figure 15:
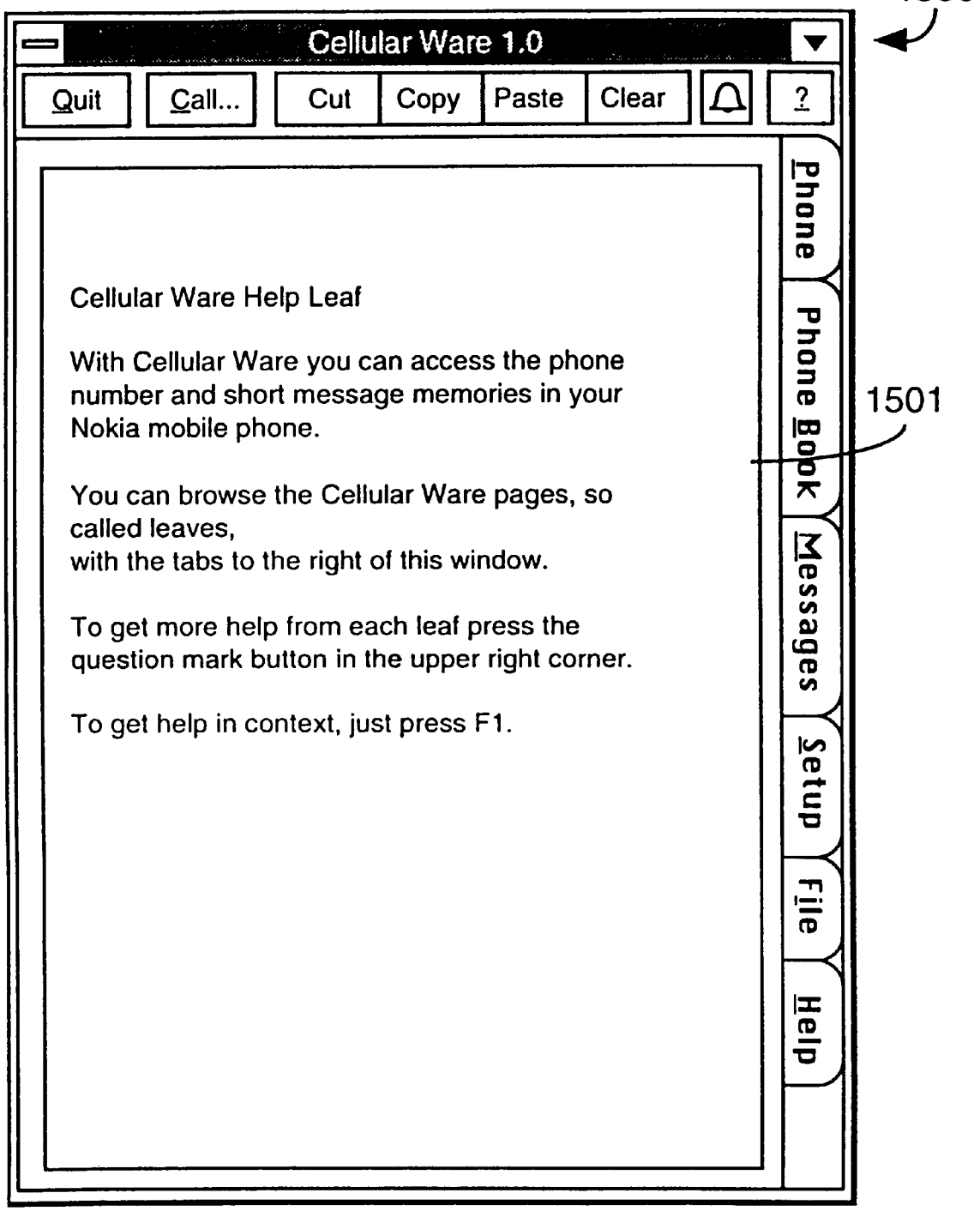

The Help page 1500 is shown in FIG. 15 and provides help on the help system, except on the cover sheet, where the Help page has been connected to the Windows help file of an actual NOKIA® 2110 phone. The help on help system works so that it gives short advice 1501 on how to use the actual SMS messaging system in accordance with the invention by clicking "F1-function button" or the "?" symbol in the upper right hand corner on the pages for example. Furthermore, it explains briefly the purpose of each page in the SMS messaging in accordance with the invention.

An assembly in accordance with the invention provides a user with the opportunity to create, manage and store many SMS messages relatively easily and efficiently with the use of a personal computer, Personal Digital Assistant (PDA) or electronic organiser. In addition, a user with access to broadcast channels for a radio telephone network can provide network services such as travel information, news information, financial information for example. These services could be subscribable to, or as a value added feature free to users of the radio telephone network.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A communication system for transmitting a text message to a mobile terminal, comprising
    a radio communication network,
    a remote mobile terminal operable with the radio communication network,
    a local mobile terminal operable with the radio communication network, the local mobile terminal including a user alterable memory means capable of storing a text message, and
    means for coupling the local mobile terminal to an external computer apparatus for enabling data transfer between the local mobile terminal and the computer apparatus, wherein said user alterable memory means is accessible from said external computer apparatus for at least one of read accesses or write accesses, and wherein there is provided
    data processing means associated with the computer apparatus for operating on text message data transferable to the user alterable memory means, and
    message sending means for utilising said text message data for transmitting to said remote mobile terminal a text message generated at the computer apparatus.

2. A communication system according to claim 1 including a local mobile terminal operative to receive a text message, wherein received text message data is transferable to the external computer apparatus via the coupling means, and the data processing means is capable of operating on the received text message data.

3. A communication system according to claim 1, wherein the data processing means is capable of storing said text message data in memory means associated with the computer apparatus.

4. A communication system according to claim 1, wherein the data processing means is capable of storing said text message data in the local mobile terminal user alterable memory means.

5. A communication system according to claim 1, wherein the text message data is a text message.

6. A communication system according to claim 1, wherein the text message data is representative of an address of a remote mobile terminal.

7. A communication system according to claim 5, wherein the data processing means addresses the text message to one or more remote mobile terminals for transmitting the text message to said one or more remote mobile terminals.

8. A communication system according to claim 5, wherein the data processing means is capable of manipulating at least one of a plurality of text messages or remote mobile terminal addresses into a predetermined sequence.

9. A communication system according to claim 5, wherein the data processing means addresses the text message to one or more remote mobile terminals for transmitting the text message to said one or more remote mobile terminals, and the data processing means is capable of manipulating at least one of a plurality of text messages or remote mobile terminal addresses into a predetermined sequence.

10. A communication system according to claim 9, wherein the data processing means is capable of forming a sequence of text messages addressed to one or more remote terminal for sequential transmission to respectively addressed remote mobile terminals.

11. A communication system according to claim 1, wherein the computer apparatus includes a computer keyboard.

12. A communication system according to claim 1, wherein the computer apparatus comprises a visual display for displaying information relating to said text message data.

13. A communication system according to claim 1, wherein the computer apparatus is capable of indicating successful transmission of a text message.

14. A communication system according to claim 12, wherein indication of successful transmission is by means of an ideographic indicia.

15. A method for transmitting text messages to a remote mobile terminal, comprising
    coupling a local mobile terminal to an external computer apparatus to enable data transfer therebetween,
    operating on text message data transferred to the computer apparatus and transferable to user alterable memory means disposed in the local mobile terminal, wherein the user alterable memory means is accessible from the external computer apparatus for at least one of read accesses or write accesses, and
    utilising the text message data for transmitting a text message generated at the computer apparatus to the remote mobile terminal via the local mobile terminal.

16. A method according to claim 15 including receiving a text message, comprising transferring received text message data to the external computer apparatus, and operating on the received text message data.

17. A method according to claim 15, wherein the data is storable in memory means associated with the computer apparatus.

18. A method according to claim 15, wherein the data is storable in the user alterable memory means.

19. A method according to claim 18, wherein the data is stored in the user alterable memory means prior to a text message associated therewith being transmitted to the remote mobile terminal.

20. A method according to claim 15, wherein the text message data is a text message.

21. A method according to claim 15, wherein the text message data is representative of an address of a remote mobile terminal.

22. A method according to claim 20, comprising addressing the text message to one or more remote mobile terminal addresses for transmitting the text message to the one or more remote terminals.

23. A method according to claim 15, wherein the text message data is a text message and further comprising addressing the text message to one or more remote mobile terminal addresses for transmitting the text message to the one or more remote terminals.

24. A method according to claim 20, comprising forming at least one of a plurality of text messages or remote mobile terminal addresses into a predetermined sequence.

25. A method according to claim 24, comprising forming a sequence of text messages addressed to one or more remote terminals and sequentially transmitting the text messages to respective remote mobile terminals.

26. Computer apparatus for use with a local mobile terminal of a type that is operable with a radio communication network, said local mobile terminal comprising a user alterable memory means capable of storing a text message, said computer apparatus comprising:

means for coupling said computer apparatus to said local mobile terminal for enabling data transfer between said local mobile terminal and said computer apparatus, wherein said user-alterable memory means of said local mobile terminal is accessible from said computer apparatus for at least one of read accesses or write accesses;

data processing means for operating on text message data transferable to said user alterable memory means, and message sending means for utilizing said text message data for transmitting, via said local mobile terminal, a text message generated at the computer apparatus.

27. Computer apparatus according to claim 26, further adapted to interface with said local mobile terminal for converting said local mobile terminal signals to signals suitable for the computer apparatus, and computer apparatus signals into signals suitable for said local mobile terminal.

28. Computer apparatus according to claim 26 capable of storing the text message data in memory means associated with the computer apparatus.

29. Computer apparatus according to claim 26, wherein a write access stores the text message data in the user alterable memory means.

30. Computer apparatus according to claim 26, wherein the text message data is comprised of at least one of a text message or a representation of an address of a remote mobile terminal, the computer apparatus being capable of addressing the text message to one or more remote mobile terminal addresses for transmitting the text message to said one or more remote mobile terminals.

31. Computer apparatus according to claim 30, capable of forming at least one of a plurality of text messages or remote mobile terminal addresses into a predetermined sequence.

32. Computer apparatus according to claim 31, capable of forming a sequence of text messages addressed to one or more remote terminal addresses and sequentially transmitting the text messages to respective remote mobile terminals.

* * * * *